United States Patent [19]
Griffies et al.

[11] 3,863,342
[45] Feb. 4, 1975

[54] SABER SAW

[75] Inventors: David R. Griffies, Joppa, Md.;
Russell O. Robison, Plymouth, Ohio; Robert W. Taylor, Jackson, Tenn.

[73] Assignee: Rockwell International Corporation, Pittsburgh, Pa.

[22] Filed: Sept. 17, 1971

[21] Appl. No.: 181,471

[52] U.S. Cl. .................. 30/393, 30/376, 83/647, 83/758
[51] Int. Cl. .................. B27b 19/08, B23d 49/10
[58] Field of Search ........ 30/393, 392; 83/647, 753, 83/757, 758, 769

[56] References Cited
UNITED STATES PATENTS

| | | | |
|---|---|---|---|
| 1,651,101 | 11/1927 | Pays | 83/769 X |
| 2,931,402 | 4/1960 | Papworth | 30/393 |
| 2,946,358 | 7/1960 | Bruch | 30/393 |

*Primary Examiner*—Donald R. Schran

[57] ABSTRACT

A portable, power-operated sabre saw having a power driven saw blade holder which is curved and which is mounted in the sabre saw housing for reciprocation along a curved path that is determined by its curvature to impart to a blade carried thereby a component of cutting stroke travel that is in the direction in which the blade is urged against a workpiece to cut the workpiece. Another feature disclosed herein is a couterweight which dynamically counterbalances the mass of the saw blade holder and the saw blade and which is recessed to receive a power driven gear that supplies the motion for reciprocating the holder and the counterweight. The counterweight is confined between and guided for reciprocating motion by opposed side wall regions of a longitudinally split housing, and a guide pin, which is trapped between the halves of the split housing, extends through a slot in one end of the counterweight to provide a further guide for the counterweight. Also disclosed herein is two-part bearing holder assembly in which locating protuberance is formed on one part to transversely locate the second part, but which permits relative axial displacement of the second part to enable the second part to be axially positioned by engagement with a spherically contoured surface of a bearing that is clamped between the two bearing holder parts. The second part mounts a gear supporting idler shaft to ensure that the axis of the idler shaft is parallel with the axis of the bearing seat on the second part. Another feature disclosed herein is a sabre saw blade chuck assembly that so distributes operating forces developed during sawing so as to reduce the likelihood of structure failure of the blade holder.

6 Claims, 22 Drawing Figures

PATENTED FEB 4 1975

INVENTORS
DAVID R. GRIFFIES
RUSSELL O. ROBISON
ROBERT W. TAYLOR

Strauch, Nolan, Neale, Nies & Kurz
ATTORNEYS

INVENTORS
DAVID R. GRIFFIES
RUSSELL O. ROBISON
ROBERT W. TAYLOR

BY Strauch, Nolan, Neale, Nies & Kurz

ATTORNEYS

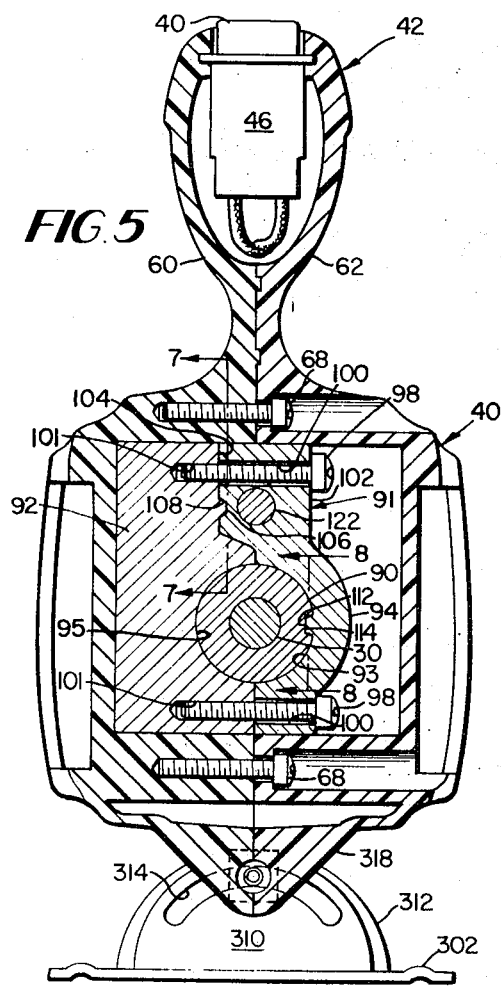
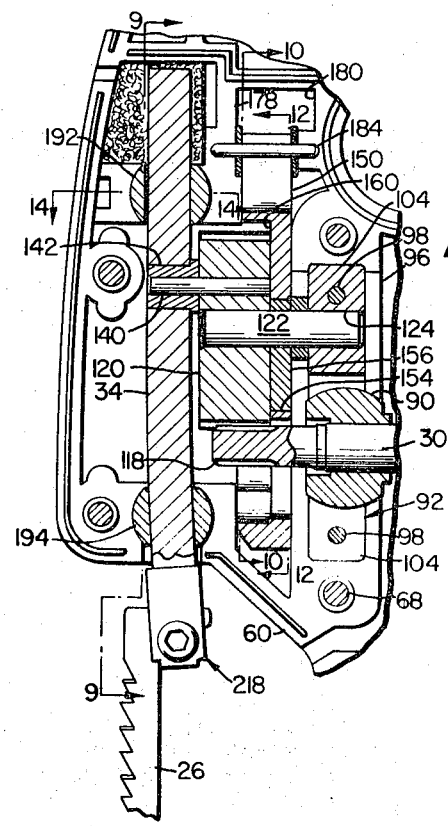
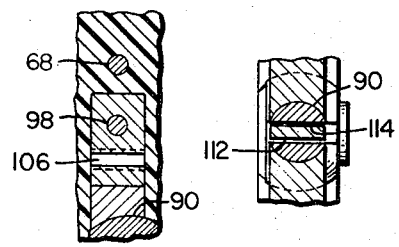
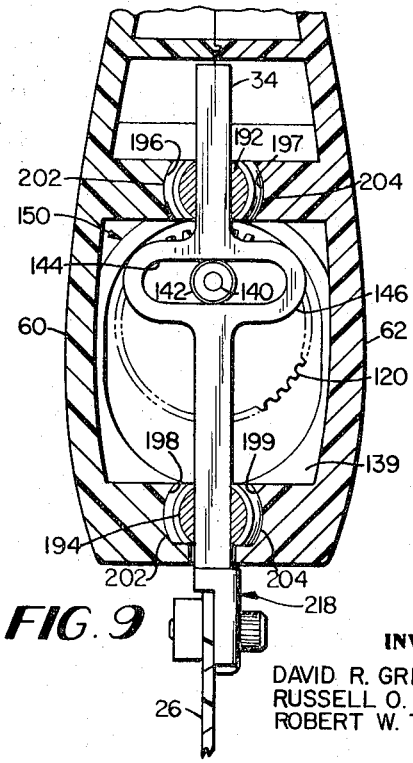

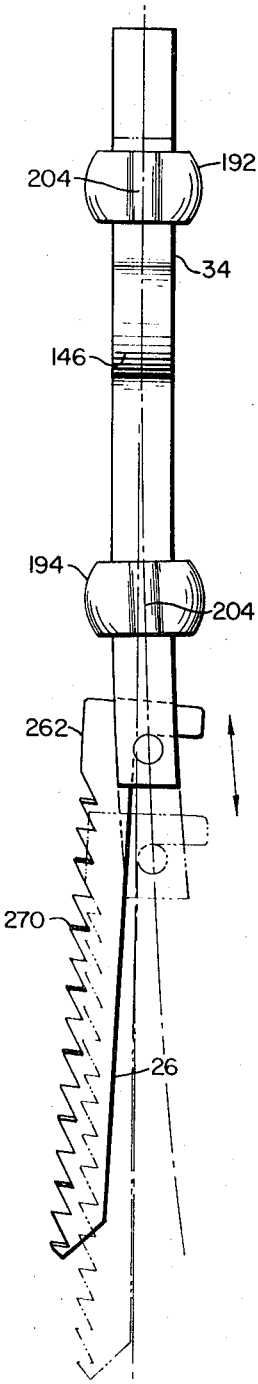
FIG. 15
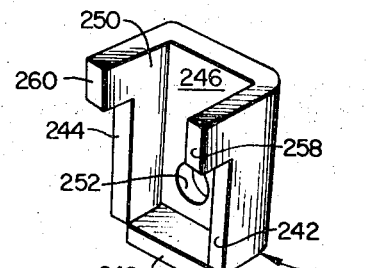
FIG. 19
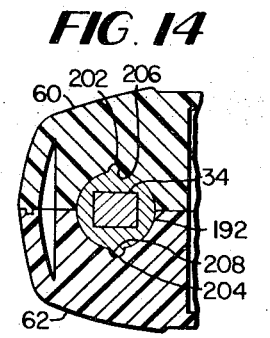
FIG. 14
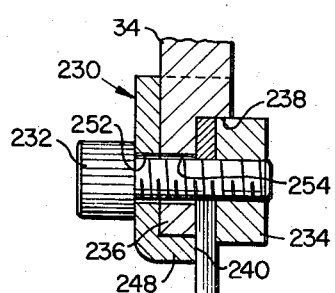
FIG. 17
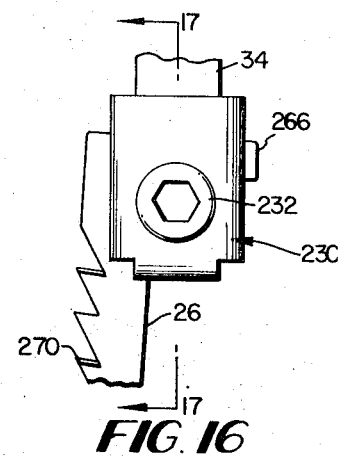
FIG. 16
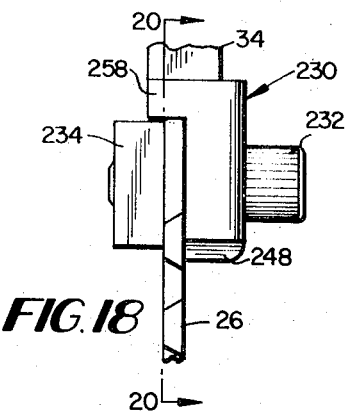
FIG. 18
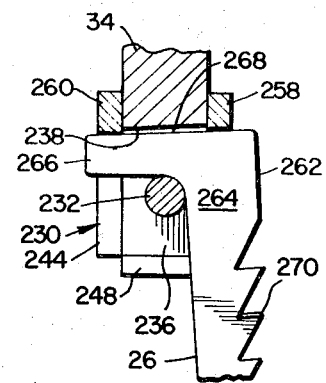
FIG. 20
FIG. 21
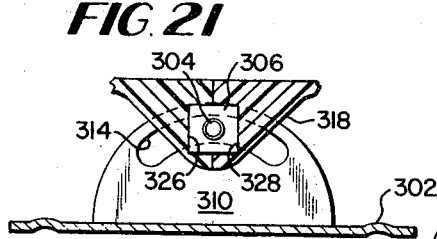
INVENTORS
DAVID R. GRIFFIES
RUSSELL O. ROBISON
ROBERT W. TAYLOR

SABER SAW

FIELD OF INVENTION

This invention relates to power tools and is particularly concerned with electrically powered sabre saws.

BACKGROUND SUMMARY AND OBJECTS OF INVENTION

Prior to this invention it has been the practice to mount a sabre saw cutting blade on a straight blade holder which is reciprocated along a linear path. The sabre saws described in U.S. Pat. Nos. 2,902,067 (issued on Sept. 1, 1959 to R. C. Oakley) and 2,970,484 (issued to W. E. Springer on Feb. 7, 1961) are typical of this construction.

It also has previously been proposed to provide an aggressive cutting action by orbiting the saw blade so that it moves into the end of the kerf during the upward, cutting stroke and away from the end of the kerf on the downward, return stroke. The saws described in U.S. Pat. Nos. 3,457,796 (issued to H. K. Leach et al. on July 29, 1969) and 3,374,814 (issued to A. Kaufmann on Mar. 26, 1968) are typical of the foregoing orbital saw blade motion.

The orbital saw blade motion mentioned above is conventionally achieved by pivotally mounting either the saw blade or the blade holder and by rocking the pivotally mounted part as the blade holder is vertically reciprocated. Although such a blade movement provides an advantageous aggressive cutting action, the mechanism for both rocking and reciprocating the saw blade is more expensive as compared with those drive mechanisms that provide only for linear reciprocation of the saw blade.

The present invention achieves a corresponding aggressive cutting action without requiring the saw blade or the saw blade holder to be pivotally mounted and without requiring the mechanism for rocking the pivotally mounted part. This is accomplished by providing the blade holder with an arcuate or curved configuration and by mounting the blade holder so that it reciprocates along a curved path that is determined by its curved configuration. The curvature is such that the saw blade is provided with a rectilinear component of motion which is in the direction of feeding (i.e., the direction in which the saw blade teeth are urged against the workpiece) on the upward cutting stroke and which is in the opposite direction or away from the end of the kerf on the downward cutting stroke. As a result, the teeth on the saw blade are moved into the end of the kerf with an aggressive cutting action on the upward, cutting stroke and away from the end of the kerf on the downward, return stroke.

In the preferred embodiment of this invention the blade holder has a uniform radius of curvature and is bowed in the direction of feeding towards the end of the kerf.

With the foregoing in mind, a major object of this invention is to provide a novel sabre saw in which an aggressive cutting action is achieved by providing the blade holder with an arcuate configuration and by mounting the holder so that it reciprocates along its axis of curvature.

It heretofore has been the practice to secure the sabre saw blade to the blade holder by means of a screw which extends through a screw hole in the saw blade shank and which is threaded into the holder to confine the saw blade shank between the screw head and an opposing face on the holder. This technique of mounting the saw blade was found to be unsatisfactory when the blade holder is formed from powered metal without a larger cross section because stress concentrations around the screw hole subject the powered metal holder to structural failure especially during such cutting operations as plunge cutting.

The present invention overcomes the foregoing problem by providing a novel chuck or blade mounting assembly which distributes the stresses developed during operation to avoid structural failure of powered metal blade holders. According to a preferred embodiment of this invention, the saw blade mounting assembly comprises a channel shaped reinforcing member which receives the lower end of the blade holder and which is secured to the blade holder by a nut and screw assembly. The screw extends through the reinforcing member with a relatively tight fit. However, the screw hole through the blade holder is oversized to provide a loose fit between the holder and the screw. As a result, all of the forces transmitted by the saw blade to the screw are applied to the reinforcing member rather than directly through the screw to the blade holder. The forces applied to the reinforcing member are applied to the blade holder through stress distributing sides and ear portions on the reinforcing member.

Thus, a further object of this invention is to provide for a novel sabre saw blade mounting assembly that distributes the stresses developed during sawing and thereby reduces the likelihood of structural failure of the blade holder.

As shown in the previously mentioned Springer U.S. Pat. No. 2,970,484, a blade holder drive gear is drive connected by one scotch yoke mechanism to the blade holder and by another scotch yoke mechanism to a counterweight which reciprocates to counterbalance the efect of the reciprocating blade holder and saw blade assembly. As compared with the axial length of the drive gear and counterweight assembly in this patent, the present invention provides for a corresponding assembly of greater axial compactness.

Thus, another important object of this invention is to provide a novel sabre saw having an axial compact arrangement of a blade holder drive gear and a counterweight which is utilized to counterbalance the effect of the reciprocable blade holder and blade assembly. This object is accomplished by partially receiving the drive gear in a recess that is formed in the counterweight.

In further accordance with this invention the counterweight is provided with a novel simplified, three-point guide arrangement for guiding the reciprocable motion of the counterweight. According to the preferred embodiment of this invention, this guide arrangement comprisess a guide pin which received with a sliding fit in a slot at the upper end of the counterweight and a pair of guide bearing members which receive the oppositely facing side edges of the counterweight.

According to this invention the sabre saw housing is longitudinally split, and the above-mentioned guide pin is trapped in position between the complementary halves of the split housing. The above-mentioned counterweight guide bearing members are separably snapped into position in cavities which are formed in the complementary housing halves.

Accordingly, another important object of this invention is to provide a novel guide structure for a counterweight in a sabre saw, and still another object of this invention is to provide a novel support for the above-mentioned counterweight guide structure in the sabre saw housing.

Prior to this invention various constructions have been proposed for mounting a sabre saw shoe platen or base on the housing of the sabre saw. One example, involving a non-tiltable base is desscribed in U.S. Pat. No. 3,186,454 issued to S. H. Kohler et al. on June 1, 1965.

In comparison with the foregoing construction, this invention provides for a tiltable base assembly which is so constructed and arranged as to be supported from a split housing solely by separable seating engagement with interior surfaces on the halves of the housing. According to this aspect of the present invention, the base assembly comprises a longitudinally extending rod member which pivotally supports the shoe platen and which is trapped between the complementary halves of the split housing.

Thus, another object of this invention is to provide a novel sabre saw having a tiltable base assembly wherein a part of the base assembly is trapped between complementary halves of a longitudinally split housing.

Still another object of this invention is to provide a novel sabre saw having a gear and blade holder compartment which is formed in the tool housing and which is partitioned from the remaining interior of the housing so that a lubricating grease introduced into the compartment does not escape into other parts of the housing containing an electric motor and switch assembly which supplies operating power for the saw blade.

Still another object of this invention is to provide a power driven tool with a novel bearing holder assembly.

According to the preferred embodiment of this invention, the bearing holder comprises an insert member and a cover or cap for supporting an inboard armature shaft bearing in the tool housing. The insert member is fixed in the housing, and the cover is detachably secured to the insert member. The insert member has a locating boss which transversely positions the cover. The outer periphery of the inboard bearing has a spherical contour which cooperates with a mating seat on the cover to position the cover axially of the bearing holder axis. The cover is also formed with a bore for mounting a gear-supporting idler shaft. Thus the axis of the idler shaft is fixed in parallel relation to the revolution axis of the seat on the cover, and the locating boss positions the cover so that the revolution axis of the seat on the cover is coincident with the axis of revolution of the bearing seat on the insert member.

Further objects of this invention will appear as the description proceeds in connection with the below-described drawings and the appended claims.

DESCRIPTION OF DRAWINGS

FIG. 5 is a section taken substantially along lines 5—5 of FIG. 2;

FIG. 6 is a fragmentary section taken substantially along lines 6—6 of FIG. 1;

FIG. 7 is a section taken substantially along lines 7—7 of FIG. 5;

FIG. 8 is a section taken substantially along lines 8—8 of FIG. 5;

FIG. 9 is a section taken substantially along liness 9—9 of FIG. 6;

FIG. 14 is a section taken substantially along lines 14—14 of FIG. 6;

FIG. 15 is an enlarged fragmentary side elevation of the blade holder and blade holder bearing subassembly in FIG. 2;

FIG. 16 is an enlarged fragmentary side elevation of the blade mounting assembly on the lower end of the blade holder;

FIG. 17 is a section taken substantially along lines 17—17 of FIG. 16;

FIG. 18 is an enlarged fragmentary front elevation of the blade mounting assembly;

FIG. 19 is a perspective view of the blade mounting member shown in FIGS. 16-18;

FIG. 20 is a section taken substantially along lines 20—20 of FIG. 18; and

FIG. 21 is a section taken substantially along lines 21—21 of FIG. 2.

DETAILED DESCRIPTION

Figure 1:
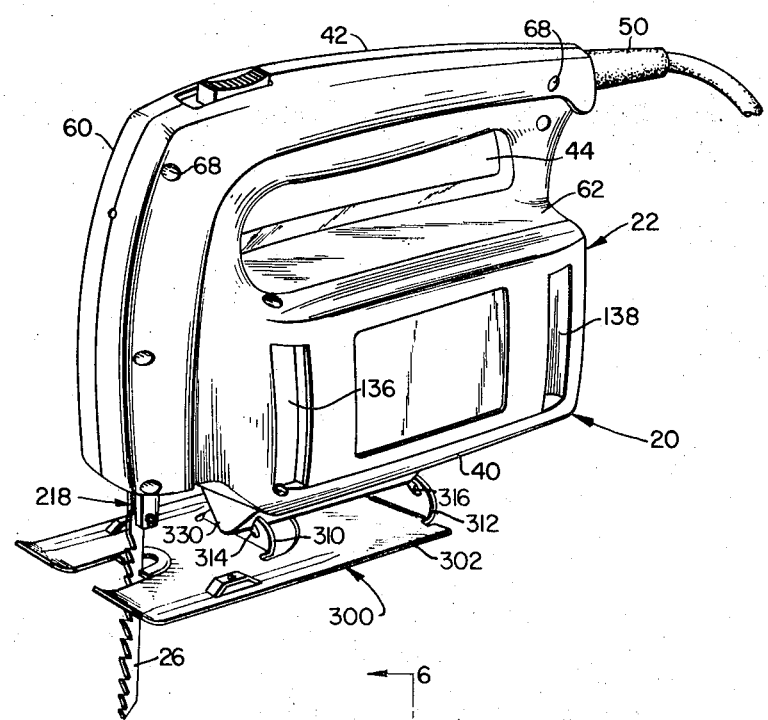
FIG. 1 is a perspective view of a sabre saw incorporating the principles of this invention.

The power driven tool incorporating the principles of this invention and shown in the drawings in a portable, hand manipulatable sabre or bayonet saw. However, as the description proceeds it will become apparent that various features of this invention are equally applicable to a wide variety of other power-driven tools.

Figure 1A:
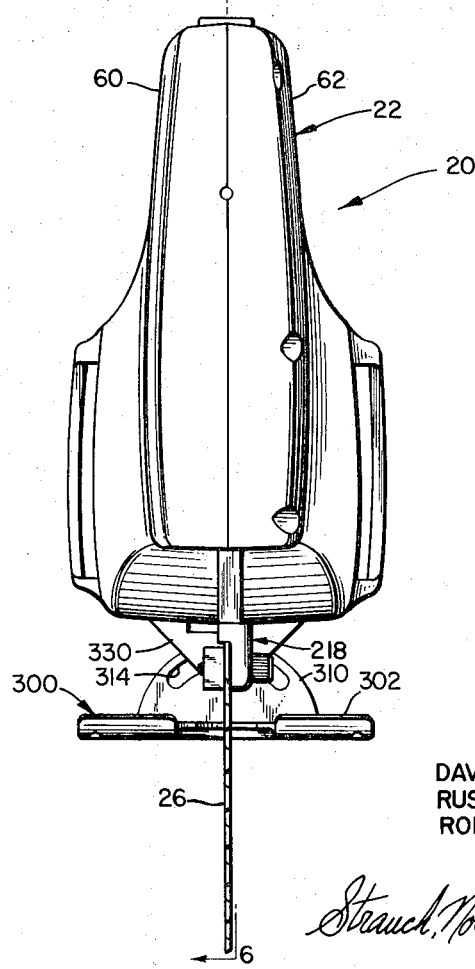
FIG. 1A is a front elevation of the sabre saw shown in FIG. 1.

The sabre saw illustrated in the drawings is generally designated at 20 in FIGS. 1 and 1A and comprises a hollow, longitudinally split, clam shell type housing or casing 22. Housing 22 contains the drive mechanism which includess an electric motor 24 (FIG. 2) for reciprocating a cutter blade 26.

Figure 2:
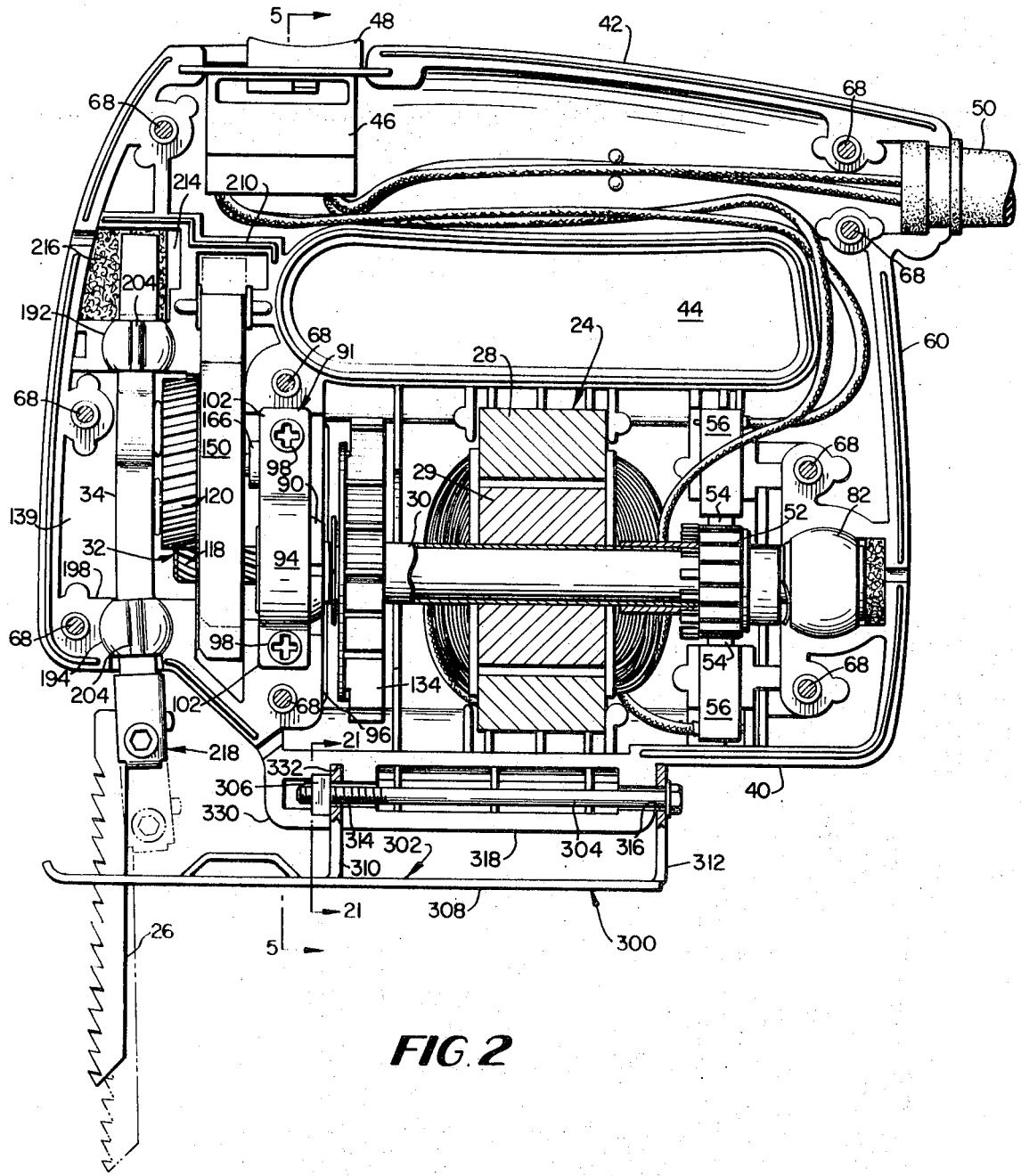
FIG. 2 is a partially sectioned side elevation showing the sabre saw of FIG. 1 with one of the halves of the longitudinally split housing removed to illustrate the internal parts of the saw.

Motor 24 may be of suitable, conventional construction and, as best shown in FIG. 2, comprises a stator 28 having field windings peripherally surrounding an armature 29. Armature 29 is mounted on an armature shaft 30 which extends coaxially through stator 28 and which is drive connected by a gear train 32 and a scotch yoke connection to a reciprocably supported blade holder 34. Blade 26 is mounted on the lower end of blade holder 34 in a manner to be described in detail later on.

With continued reference to FIGS. 1 and 2, housing 22 has a hollow body portion 40 and a hollow handle grip portion 42. Handle portion 42 is joined to body portion 40 by spaced apart front and rear rib portions in such a manner that an elongated, finger-receiving aperture 44 is formed between body portion 40 and handle grip portion 42 as shown. Handle grip portion 42 is thus disposed horizontally and above body portion 40 when the tool is in its upright, illustrated position. Handle grip portion 42 extends longitudinally with respect to body portion 40 and the rotational axis of motor 24.

As shown, handle grip portion 42 houses an electric on-off switch 46 having a manual manipulatable switch actuator 48 for controlling operation of motor 24. A conventional power cord 50 has conductors for supplying operating current to stator 28 under the control of switch 46.

As shown in FIG. 2, a commutator 52, forming a part of motor 24, is carried by shaft 30 and is electrically connected to armature 29 in the usual manner. Brush elements 54, which are spring biased into electrical contact with the commutator periphery, are mounted in electrical non-conductive brush holders 56. Armature 29 and commutator 52 are preferably electrically insulated from shaft 30 by any suitable means.

Figure 3:
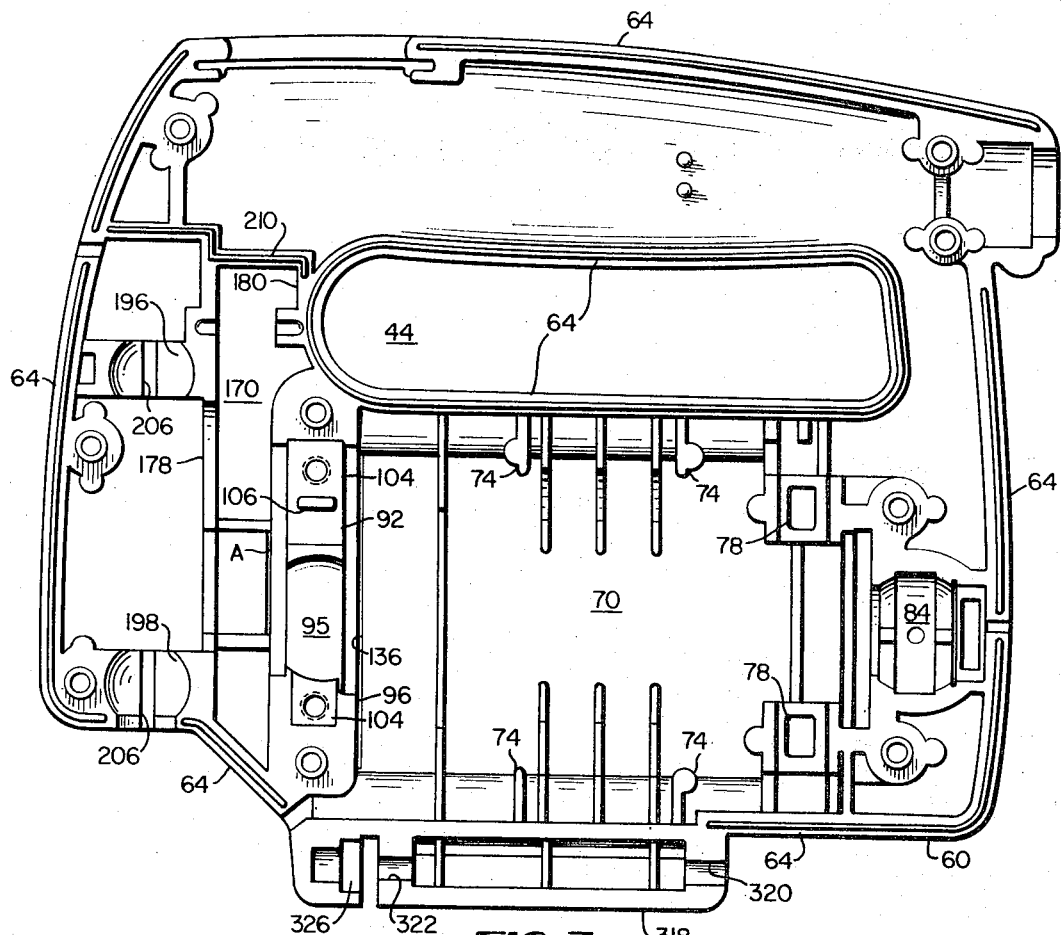
FIG. 3 is a interior side elevation of the half of the split housing shown in FIG. 2.
Figure 4:
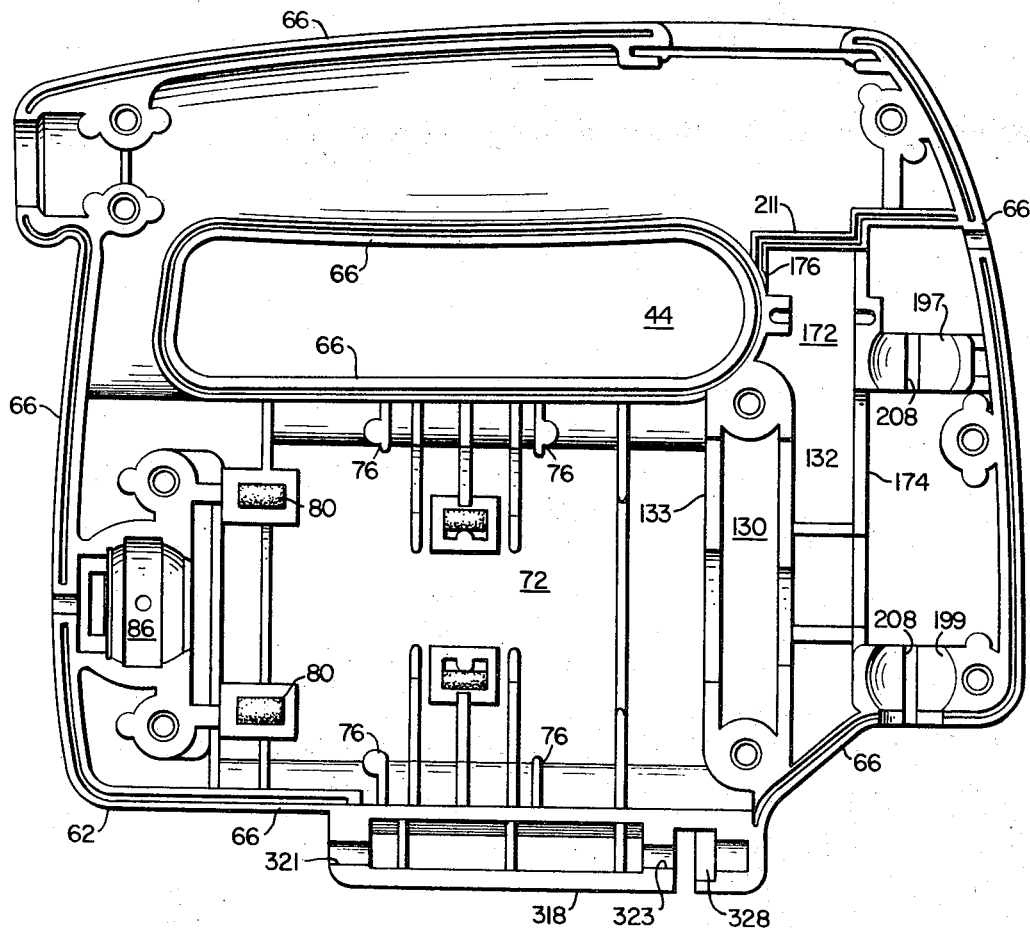
FIG. 4 is an interior side elevation of the other split housing half which is shown in FIG. 1.

Referring to FIGS. 3 and 4, housing 22 is longitudinally divided into two complementary shells 60 and 62 to provide a clam shell type enclosure for the internal parts of the sabre saw. Shells 60 and 62 are separately molded from a suitable, electrically non-coductive plastic and have oppositely dished curvatures to define the interior, mechanism-receiving cavities as hereinafter described.

Shells 60 and 62 are respectively formed with mating longitudinal edge surfaces 64 and 66 which seat against each other along a substantially planar interface that longitudinally and medially intersects body portion 40 and handle portion 42. The rotational axis of shaft 30 lies substantially in a plane containing this interface. Machine screws 68 (see FIGS. 1 and 2), extending through bores in shell 62, are threaded into tapped bores in shell 60 to firmly and rigidly secure shells 60 and 62 together.

With continued reference to FIGS. 3 and 4, shells 60 and 62 are respectively formed with ribbed, complementary cavities 70 and 72 which mate to form a motor compartment that interfittingly receives and confines stator 28. End ribs 74, and 76, which are respectively formed integral with shells 60 and 62, confine stator 28 against axial displacement. Shell 60 is also formed with cavities 78 (FIG. 3) which interfittingly receive brush holders 56. Resilient pads 80 (FIG. 4) made of rubber or other suitable material are mounted in shell 62 and engage brush holders 56 to confine them in cavities 78.

The outboard end of shaft 30 is journalled in a bearing 82 (FIG. 2). Bearing 82, which preferably comprises a spherically contoured knuckle, is interfittingly seated for limited universal rocking movement in opposed complemental cavities 84 (FIG. 3) and 86 (FIG. 4). Cavities 84 and 86 are respectively formed in shells 60 and 62, and bearing 82 is trapped and thus confined in position between shells 60 and 62 solely by separable seating engagement with the wall surfaces of cavities 84 and 86.

From the construction thus far described, it will be appreciated that stator 28, brush holders 34, and bearing 82 are trapped in position and thereby confined between shells 60 and 62 only by separable seating engagement with the cavity-defining surfaces of housing 22. Complementary portions of shells 60 and 62 define body portion 40, and additional complementary portions of shells 60 and 62 define handle grip portion 42 as well as the forward and rearward rib portions which integrally join each half of the handle grip portion of its corresponding half of body portion 40.

As shown in FIGS. 5 and 6, the inboard end of shaft 30 is journalled in a bearing 90 having a spherically contoured outer periphery similar to bearing 82. Bearing 90 is trapped between cooperating halves of a bearing holder 91. Holder 91 comprises a metallic insert member 92 and a cooperating, metallic bearing cover or cap 94. Cover 94 and insert member 92 are respectively formed with opposed spherically contoured seating surfaces 93 and 95 which interfittingly seat against the spherically contoured periphery of bearing 90. Cover 94 and holder member 92 are preferably fabricated from a suitable metal having a relatively high thermal conductivity such as aluminum or an aluminum alloy. Bearings 82 and 90 may be formed from suitable bearing material.

As shown in FIGS. 3 and 5, member 92 is preformed, and an internal wall or boss portion 96 of shells 60 is molded around insert member 92 in the process of molding shell 60. Except for the exposed interior face of member 92, which contains the seating surface 95, member 92 is substantially embedded in wall portion 96. Cover 94 is detachably fixed to member 92 by cap screws 98 which extend through smooth walled bores 100 in cover 94 and which are threaded into tapped bores 101 in member 92. Bores 100 are formed in ear portions 102 of cover 94, and bores 101 are formed in corresponding ear portions 104 of member 92. Bearing 90 is confined against axial displacement relative to shell 60 and to bearing holder 91 by engagement with seating surfaces 93 and 95.

Seating surfaces 93 and 95 extend to the interfaces between each pair of ear portions 102 and 104 to define an annular bearing holder seat for bearing 90. The axes of bores 101 are contained in a common plane perpendicularly intersecting a common longitudinal axis of the seating surfaces 93 and 95. The axes of bores 101 are also perpendicular to the interfaces between ear portions 102 and 104.

Referring to FIGS. 3 and 7, member 92 is integrally formed with a locating boss or protuberant portion 106 which extends from the otherwise flat face of one of the ear portions 104. Boss 106 is straight and extends parallel to the longitudinal axis of revolution of seating surface 95. As shown in FIG. 5, boss 106 is interfittingly and slidably received in a mating groove 108 which is formed in the opposed one of ear portions 102. Boss 106 is tapered towards its outer end, and groove 108 is correspondingly tapered to provide a good piloting fit of boss 106 in groove 108.

Seating engagement of boss 106 in groove 108 properly locates cover 94 on member 92 along a plane extending parallel to the interfaces between ear portions 102 and 104. Boss 106 cooperates with groove 108 in such a manner that the revolution axis of seating surface 93 coincides with and is therefore parallel to the revolution axis of seating surface 95.

As shown in FIG. 8, cover 94 is integrally formed with a protuberant key portion 112 which extends radially inwardly from an intermediate region of seating surface 95. Protuberant portion 112 is seated in a longitudinally extending, outwardly opening groove 114 which is formed in bearing 90 to confine bearing 90 against rotation relative to cover 94 and member 92.

Boss 106, being straight and parallel to the longitudinal axis of holder 91, permits axial displacement of cover 94 relative to member 92, but prevents transverse movement of cover 94 relative to member 92 along a plane transversely intersecting the axes of screws 98. Engagement of bearing 90 with seating surface 93 properly positions cover 94 axially with respect to member 92. Thus, cover 94 is transversely and axially located respectively by boss 106 and bearing 90. The spherical contours of bearings 82 and 90 and their associated seating surfaces provided for limited universal movement of the bearings to accommodate any slight misalignment between the longitudinal axes of the split, annular bearing seats for bearings 82 and 90 respectively. Member 92 and cover 94 provide a heat sink for dissipating heat produced by friction resulting from rotation of shaft 30 in bearing 90.

As shown in FIGS. 2 and 6, the end of armature shaft 30 projecting beyond bearing 90 is formed with a spiral gear 118 which constantly meshes with a blade-holder drive gear 120. Gear train 32 is defined by gears 118 and 120.

Gear 120 is coaxially journalled on one end of an idler shaft 122. The other end of shaft 122 is coaxially fixed in a smooth walled bore 124 which is formed in cover 94 along an axis extending in parallel spaced apart relation to the longitudinal revolution axes of seating surfaces 95 and 93. shaft 122 is mounted in cantilever fashon on cover 94.

From the foregoing construction it will be appreciated that cover 94 fixes the axis of shaft 122 relative to the revolution axis of seating surface 95. Thus, by forming bore 124 in cover 94, cover 94 establishes parallelism beween the rotational axis of gear 120 and the longitudinal axis of revolution of seating surface 95, while boss 106 establishes parallelism between the axes of revolution of seating surfaces 93 and 95. As a result, the bearing seat that holder 91 provides will properly be positioned relative to the rotational axis of gear 120 to promote proper meshing engagement between gears 118 and 120. Bores 100 are oversized with respect to screws 98 so that screws 98 extend with a loose fit through bores 100, thereby permitting cover 94 to be positioned by locating boss 106 and bearing 90 in the previously described manner.

As shown in FIG. 3, wall portion 96 is integrally joined to and extends between the upper and lower wall portions of the half of body portion 40 that is defined by shell 60. The portions of the sub-assembly of cover 94 and bearing 90 which protrude inwardly beyond wall portion 96 are matingly received in a cavity 130 (FIG. 4). Cavity 130 is formed in shell 62 between two axially spaced apart partition walls 132 and 133. Walls 132 and 133 form a part of shell 62.

As shown in FIG. 2, a motor-cooling fan 134 is mounted on armature shaft 30 axially adjacent to bearing 90 and bearing holder 91. Fan 134 draws air into housing 22 through inlet apertures 136 (one shown in FIG. 1) which are formed in shell 60 and 62 and forces the air over the windings of armature 29 and stator 28. The heated air that is passed over the armature and stator windings is discharged from housing 22 through outlet apertures 138 which are formed in shells 60 and 62 adjacent to and just inwardly from bearing 90. Apertures 138 are disposed adjacent to wall portion 96 and cavity 130 so that air is exhausted through apertures 138 over the exterior housing surfaces that are in the region of bearing holder 91 to cool the portions of shells 60 and 62 in the region of holder 91.

Walls 132 and 133 cooperate with wall portion 96 to form a partition that divides the interior of body portion 40 into two compartments. One compartment receives motor 24 and fan 134 and the other compartment, which is indicated at 139 in FIG. 2, receives blade holder 34 and gears 118 and 120. A lubricating grease or plastic lubricant is advantageously introduced into the shell cavities defining compartment 139 to lubricate the moving parts therein. The partition defined by wall 132 and wall portion 96 prevents the lubricating grease in compartment 139 from leaking into the motor receiving compartment in body portion 40.

Referring in FIGS. 6 and 9, a drive or crank pin 140 is eccentrically fixed to gear 120 along an axis that is parallel to and spaced apart from the axis of idler shaft 122. Drive pin 140 extends from the side of gear 120 that faces blade holder 34. A drive roller 142 is journalled on the forward free end of drive pin 140 and is received with a rolling fit in a transversely elongated aperture 144 that is formed through an enlarged, intermediate, crosshead portion 146 of blade holder 34. Roller 142 engages the straight side edges of aperture 144 which are parallel and perpendicular with respect to the rotational axis of gear 120. Thus, roller 142 and crosshead 146 provide a scotch yoke connection that transmits a linear component of the rotary movement of gear 120 to reciprocate blade holder 34 in a plane containing the rotational axis of gear 120. By this construction it is clear that when motor 24 is energized, gear 120 is rotated by shaft 30 to displace drive pin 140 in a circular path coaxially around the rotational axis of gear 120. As a result, drive roller 142 rolls back and forth between the opposite curve ends of aperture 144 to thereby reciprocate blade holder 34 in a plane which extends radially of the rotational axis of gear 120 and which is vertical when sabre saw 20 is in its upright, illustrated position. The reciprocatory movement of blade holder 34 is counterbalanced by a counterweight 150 which is mounted in compartment 139.

Figure 10:
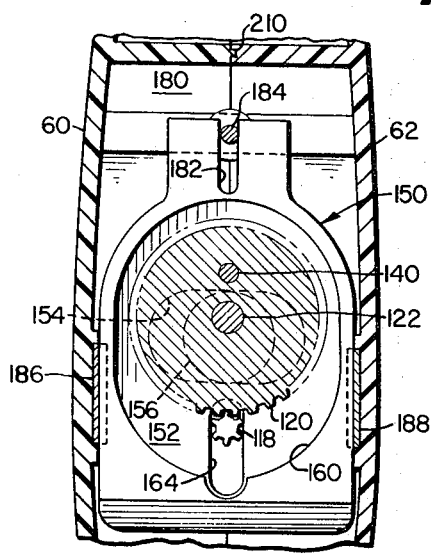
FIG. 10 is a section taken substantially along lines 10—10 of FIG. 6.
Figure 11:
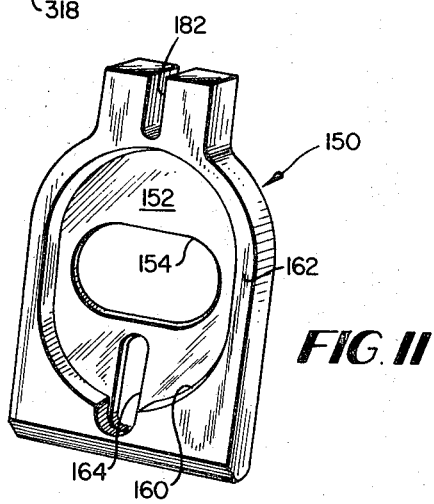
FIG. 11 is a perspective view of the counterweight shown in FIG. 2.
Figure 12:
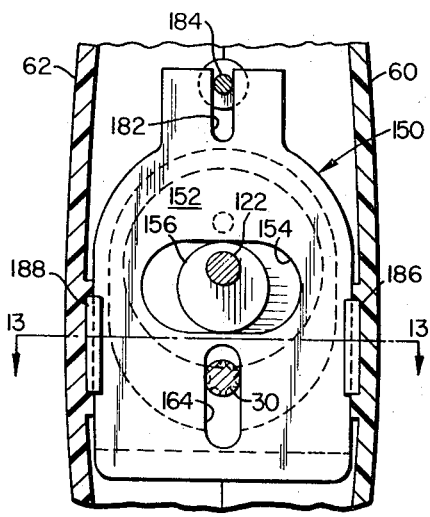
FIG. 12 is a section taken substantially along lines 12—12 of FIG. 6.

As shown in FIGS. 10-12, counterweight 150 is formed with a plate portion 152 which extends substantially at right angles to the rotational axis of gear 120. Plate portion 152 is formed with a transversely elongated aperture or slot 154 which slidably receives an eccentric hub 156. Hub 156 is formed integral with gear 120 and projects from the side of gear opposite from drive pin 140. Hub 156 is formed along an axis that is in parallel spaced apart relation to the rotational axis of gear 120. The side edges of aperture 154, which are engaged by hub 156, are straight and parallel and extend perpendicularly with respect to the rotational axis of gear 120.

Hub 156 cooperates with aperture 154 to define a further scotch yoke connection. As gear 120 rotates, hub 156 will be displaced in a circular path coaxial with the rotational axis of gear 120. As a result, hub 156 will slide back and forth in aperture 154 to thereby transmit to counterweight 150 only a linear component of its rotary movement, with the linear component being vertical when sabre saw 20 is held in its upright position as illustrated in the drawins. Thus, counterweight 150 is caused to reciprocate along a path that extends perpendicularly of the rotational axis of gear 120.

Counterweight 150 dynamically counterbalances the mass of blade holder 34 and blade 26. More particularly, hub 156 and drive pin 140 are diametrically opposed relative to the rotational axis of gear 120, and the mass and reciprocating travel of counterweight 150 is effective to counterbalance the mass and reciprocating travel of blade holder 34 and other associated parts including blade 26. As a result, no significant fatigue-producing vibrations are developed by the high speed reciprocation of blade holder 34.

An axially compact sub-assembly is achieved by forming an enlarged recess 160 in the side of counterweight 150 which faces blade holder 34. The bottom wall of recess 160 is defined by plate portion 152, and recess 160 opens towards blade holder 34 to partially receive drive gear 120. As best shown in FIG. 11, the side wall surfaces delimiting recess 160 are formed on a wall portion 162. Wall portion 162 is integral with plate portion 152 and extend forwardly therefrom. Wall portion 162 peripherally surrounds gear 120 but is spaced therefrom so as not to interfere with the rotary movement of the gear.

As best shown in FIG. 10, plate portion 152 is additionally formed with a vertically elongated aperture 164 below aperture 154. The inboard end of armature shaft 130, on which gear 118 is formed, extends freely through aperture 164. Aperture 164 is elongated in the direction of reciprocation of counterweight 150 so that sufficient clearance is provided between the edges of aperture 164 and gear 118 to prevent any engagement between counterweight 150 and shaft 130 that would interfere with the rotational motion of shaft 30. Idler shaft 122 extends through and thus is peripherally surrounded by the eccentric hub 156. Shaft 122 thus passes freely through aperture 154 and does not guide the reciprocatory motion of counterweight 150. The structure for guiding counterweight 150 will be described later on.

As best shown in FIG. 2, eccentric hub 156 terminates in a flat end face which is essentially flush with the flat side of plate portion 152 facing motor 24. Gear 120 is axially confined on shaft 122 between opposed surfaces of a raised boss portion 166 and blade holder 34. Boss portion 166 is formed on cover 94 coaxially around shaft 122 and projects from cover 94 towards gear 120. Thus, axially displacement of gear 120 is limited in one direction by abutment of eccentric hub 156 with boss portion 166. Axial movement of gear 120 in the opposite direction is limited by abutment of gear 120 with the flanged portion of drive roller 142. (FIG. 6).

The foregoing construction provides for an exceptionally axially compact sub-assembly of blade holder 34, drive gear 120, eccentric hub 156, and counterweight 150.

The interface along which the edge surfaces 64 and 66 seat substantially medially intersect blade holder 34 and counterweight 150 and contains the rotational axis of gear 120. Counterweight 150, as best shown in FIG. 10, is received in complementary cavities 170 (FIG. 3) and 172 (FIG. 4) which are respectively formed in shells 60 and 62. Cavities 170 and 172 form a part of compartment 139.

As shown in FIG. 4, cavity 172 is delimited by wall 132, and additional wall portions 174 and 176 of shell 62. Wall portion 176 delimits the forward end of aperture 44.

As best shown in FIG. 3, cavity 170 is delimited by wall portion 96 and additional wall portions 178 and 180 of shell 60. Wall portion 180 delimits the forward end of aperture 44. Wall portion 180 is aligned with wall portion 176. The edges of wall portion 180 and 176 seat against each other. Wall portion 178 is aligned with wall portion 174.

As shown in FIG. 10, a slot 182 is medially formed through the upper end of counterweight 150. Slot 182 is parallel to the linear path of reciprocation of counterweight 150 and opens upwardly at the upper edge of counterweight 150 as shown. Slot 182 is medially intersected by the interface between the shell seating edges 64 and 66.

Referring to FIGS. 2 and 10, a cylindrically smooth guide pin extends through slot 182 with a sliding fit. The longitudinal axis of pin 184 is perpendicular to the linear path of reciprocation of counterweight 150 and is parallel to but spaced apart from the rotational axes of shafts 122 and 30. The end of pin 184 projecting forwardly from counterweight 150 is seated in complementary recessed regions which are respectively formed in the abutting edges of wall portions 174 and 178. The end of pin 184 projecting rearwardly from counterweight 150 is seated in complementary recessed regions which are formed in abutting edges of wall portions 176 and 180. Pin 184 is thus clamped and thereby confined in place solely by separable seating engagement with opposed complementary surfaces of shells 60 and 62.

Relative sliding engagement of the cylindrical periphery of guide pin 184 with the flat, straight, parallel side edges of slot 182 guides the movement of counterweight 150 in cooperation with a pair of channel-shaped, metallic bearing guides 186 and 188 (FIGS. 12 and 13) to confine displacement of counterweight 150 to rectilinear motion.

Figure 13:
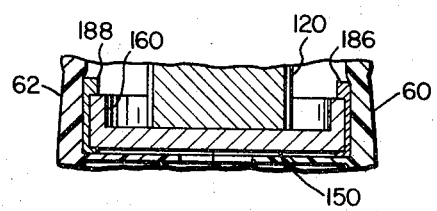
FIG. 13 is a section taken substantially along lines 13—13 of FIG. 12.

As best shown in FIG. 13, guides 186 and 188 open inwardly toward each other to respectively receive the opposite side edges of counterweight 150. These counterweight side edges are flat, parallel and smooth and are interfittingly received respectively in guides 186 and 188.

Still referring to FIG. 13, guide 186 is separably seated in cavity 170 between wall portion A (FIG. 3) and wall portion 178. Guide 186 is snapped in place and held in position by frictional engagement with the opposed surfaces of wall portions A and 178. Similarly, guide 188 is seated in cavity 172 between wall portins 132 and 174. Guide 188 is snapped in place and retained in position by frictional engagement with the opposed surfaces of wall portions 132 and 174. Guides 186 and 188 engage intermediate regions of the oppositely facing side edges of counterweight 150 below pin 184. Thus, a three point guide arrangement is provided by pin 184 and guides 186 and 188 for guiding the reciprocable movement of counterweight 150.

As shown in FIGS. 2 and 9, a pair of spaced apart bearings 192 and 194 are provided for blade holder 34. The portions of blade holder extending above and below portion 146 are formed with a rectangular cross section. This upper portion of blade holder 34 interfittently extends through a mating aperture in bearing 192, and the lower portion of blade holder 34 interfittingly extends through a mating aperture in bearing 194. Bearings 192 and 194 are thus spaced axially apart along the axis of blade holder 34 above and below portion 146. Owing to the non-circular cross section of the bearing-receiving portions of blade holder 34 and the correspondingly configured non-circular apertures in bearings 192 and 194, blade holder 34 is prevented from rotating or turning about its axis relative to bearings 192 and 194.

As shown in FIG. 9, bearing 192 interfittingly seated in complementary recessed regions of wall portions 196 and 197. Wall portions 196 and 197 are respectively formed integral with shells 60 and 62. Bearing 194 is similarly interfittingly seated in complementary recessed portions of wall portions 198 and 199. Wall portions 198 and 199 are respectively formed integral with shells 60 and 62. By this construction, bearings 192 and 194 are clamped and thus confined in place solely by separable seating surface engagement with the recessed regions of wall portions 196–199.

As best shown in FIG. 14, bearing 194 is formed with a pair of diametrically oppositely extending ears 202 and 204 which are respectively interfittingly received in inwardly opening grooves 206 and 208. Grooves 206 and 208 are formed in the recessed regions of wall portions 196 and 197 respectively. Engagement of ears 202 and 204 in grooves 206 and 208 prevent bearing 192 from turning or rotating in housing 22. Bearing 194, being of the same construction as bearing 192, is also provided with ears that are received in grooves in the recessed regions of wall portions 198 and 199 to prevent bearing 194 from turning relative to housing 22. Like reference numerals have been applied to designate the ear and groove portions associated with bearing 194.

As shown in FIGS. 2–4, the upper end of compartment 139 is delimited by wall portion 196 and 197 and an additional pair of wall portions 210 and 211. The interior edges of wall portions 196 and 197 abut each other, and the interior edges of wall portions 210 and 211 also abut each other. Wall portions 210 and 211, which form a part of shells 60 and 62, define a partition between compartment 139 and the hollow switch-receiving interior of handle grip portion 42 to thus prevent lubricating grease or the like from escaping from compartment 139 into the hollow interior of handle grip 42 where switch 46 and current-carrying conductors are disposed. Forward and bottom wall portions of shells 60 and 62 which define the exterior of housing 22 also delimit compartment 139 and abut each other along edge surfaces 64 and 66. Thus, compartment 139 is completely partitioned from the remaining interior of housing 22 to prevent leakage of lubricating grease into these remaining regions. In addition, the abutting edge surfaces 64 and 66 of shells 60 and 62 prevent the lubricating grease in compartment 139 from leaking to the exterior of housing 22.

It will be appreciated that wall portions 196 and 197 cooperate with bearing 192 and the blade holder portion extending through bearing 192 to define a partition between compartment 139 and a further compartment which is indicated at 214 in FIG. 2. Stepped continuations of wall portions 210 and 211 provide a partition between compartment 214 and the interior of handle grip portin 42. Compartment 214 is thus delimited by wall portions 210, 211, 196 and 197, 174 and 178 and portions of the front wall of housing 22.

Compartment 214 is disposed above a portion of compartment 139 and receives the upper end of blade holder 34. Received in compartment 214 is one or more pieces of oil-soaked felt 216 which is at least partially wrapped around the upper end of blade holder 34 to provide a supply of lubricant that is supplied to the blade holder as it is reciprocated. Felt 216 thus acts like a wick to apply a film of lubricant to bearing holder 34.

As shown in FIGS. 1 and 2, the lower end of blade holder 34 projects through an opening in housing 22. A chuck or blade mounting assembly 218 is carried on the lower end of blade holder 34. The opening through housing 22 is formed by complementary notches in wall portions 198 and 199, and bearing 194 and the portion of blade holder 34 extending through bearing 194 to prevent lubricant in compartment 139 from leaking to the exterior of the housing.

As best shown in FIG. 15, blade holder 34, instead of being straight, is slightly curved in a plane extending parallel to the plane of blade 26. Blade holder 34 has a uniform radius of curvature, with the center of curvature being located at a point which is disposed rearwardly of the blade holder. Blade holder 34 is thus convex in the direction of feeding towards the uncut end of the kerf being cut. Bearings 192 and 194 are arranged along the curved longitudinal axis of holder 34 so that holder 34 will be reciprocated along its curved longitudinal axis.

Thus, on the upward or cutting stroke, blade 26 will be provided with two mutually perpendicular components of travel. One component will be in the upward direction, when the sabre saw is held in its illustrated upright position, and the other component will be towards the end of the kerf and in the direction in which blade 26 is pressed against the workpiece being cut. As a result, blade 26 will have an aggressive cutting action since the blade teeth will be moved both forwardly and upwardly during the cutting stroke.

Since the return stroke path is coincident or the same as the cutting stroke path, the return stroke of the blade will also have two mutually perpendicular components of travel. The directions of the return stroke components of travel will be opposite to the corresponding cutting stroke components of travel. Thus, on the return stroke, one component will be downward, and the other component will be in the direction that is opposite to the feeding direction (i.e., the direction in which the blade is urged against the workpiece to cut the kerf). On the return or downward stroke, the cutting teeth on blade 26 move away from the end of the kerf, releasing accumulations of sawdust in the kerf. As viewed from FIG. 2, blade 26 reciprocates along a segment of a circular path that is located in the third quadrant of a circle.

Advantageously, blade holder 34 may be fabricated from powdered metal to reduce costs of manufacture. However, a powdered metal blade holder is subject to structural failure as a result of forces that are transmitted to the blade holder during ordinary cutting operations. Blade mounting assembly 218 avoids this condition as will now be described.

Referring now to FIGS. 16–19, blade mounting assembly 218 comprises a force-transmitting reinforcing metallic member 230, a screw 232, and a nut 234. Member 230 is fabricated from a relatively strong metal such as steel to withstand the cutting forces without structural failure.

Member 230 is mounted by the assembly of screw 232 and nut 234 on the lower end of blade holder 34. As best shown in FIG. 17, the lower end of blade holder 34 is notched or stepped to provide a flat-sided depending end portion 236 and a downwardly facing transverse shoulder 238. Shoulder 238 extends between face 240 of portion 236 and the outer side face of the unnotched portion of bearing holder 34.

As best shown in FIG. 19, reinforcing member 230 has a U-shaped transverse cross-section and is formed with a pair of parallel spaced apart side portions 242 and 244 which are integrally joined together by a flat sided cross portion 246.

Still referring to FIG. 19, the lower end of cross portion 246 terminates in a tab or ear portion 248. Ear portion 248 and side portions 242 and 244 extend perpendicularly from cross portion 246 and cooperate with cross portion 246 to form a pocket 250 which interfittingly receives depending portion 236.

With reference to FIGS. 16-18, cross portion 246 seats against the flat side face of depending portion 236 which is opposite from face 240, side portions 242 and 244 extend along and seat against the flat, parallel front and rear faces of the end of blade holder 236, and ear portion 248 extends along and is seatable against the flat bottom edge of depending portion 236.

Screw 232, as best shown in FIG. 18, extends with a relatively tight fit through a screw hole 252 in cross portion 246 and with a loose fit through an aligning, oversized screw hole 254 which is formed through depending portion 236. The axis of screw 232 substantially perpendicularly intersects the longitudinal axis of blade holder 34 and is disposed medially between the front and rear faces of depending portion 236.

As shown in FIGS. 16 and 18, reinforcing member 230 extends upwardly beyond shoulder 238, and a pair of force-transmitting, parallel, flat sided, laterally extending ear portions 258 and 260 are formed integral with and project from side portions 242 and 244. Ear portion 258 and 260 extend substantially across the entire width of the front and back faces of blade holder 34 above shoulder 238, and the lower edges of ear portions 258 and 260 are disposed at a level below shoulder 238 for a purpose to be described in detail later on.

Blade 26 is flat-sided and, as shown in FIG. 20, terminates at its upper end in a shank 262 which is formed by a body portion 264 and an ear portion 266. Ear portion 266 extends rearwardly from the body portion 264 to define the upper edge of blade 26 as indicated at 268. Ear portion 266 projects away from body portion 264 in a direction that is opposite from the front blade edge on which the cutting teeth 270 are formed. Edge 268 is substantially perpendicular to the front edge of blade 26 containing teeth 270.

Shank 262 is clamped between face 240 and the opposed flat face of nut 234. Nut 234 is threaded on to the end of screw 232 on the side of depending portion 236 opposite from cross portion 246. The clamped portion of shank 262 includes substantially the entirety of ear portion 266. Ear portion 266 extends between screw 232 and the lower edges of ear portions 258 and 260. By tightening nut 234, blade 26 is thus clamped in place on the lower end of blade holder 34 and reinforcing member 230 is rigidly fixed to depending portion 236. The straight rearwardly facing edge of body portion 264 may abut against screw 232.

As shown in FIG. 20, the bottom edge of ear portion 258 is raised slightly relative to the bottom edge of ear portion 260 so that a plane passing through the lower edges of ear portions 258 and 260, instead of being perpendicular to a line extending tangentially of the curved longitudinal blade holder axis, is slightly upwardly inclined in a direction extending toward the front cutting edge of blade 26. Since the upper edge 268 of blade 26 is substantially perpendicular relative to the front edge of the blade containing teeth 270, then blade 26 will be slightly cocked upwardly along the plane containing the lower edges of ear portions 266 and 268 to provide blade 26 with an aggressive cutting attitude.

Shoulder 238 is sloped in a corresponding direction so as not to depend below the lower edges of ear portions 266 and 268. Therefore, blades 26 will abut against the lower edges of ears 266 and 268 and not against shoulder 238. The only surface on blade holder 34 that abuts against blade 26 will be face 240 of depending portion 236.

During operation of the sabre saw, thrust forces urging blade 26 upwardly or toward housing 22 will not be transmitted directly to blade holder 34. Instead, the thrust forces are first transmitted to ear portions 258 and 260 and through reinforcing member 230 to ear portion 248 which abuts against substantially the entire area of the lower edge of depending portion 236. As a result, the thrust forces are distributed over substantially the entire bottom area of the lower edge of depending portion 236. Forces applied to blade 26 in the plane of the blade and forces tending to twist blade 26 out of a plane extending parallel to face 240 will be transmitted first directly to scrw 232. Since screw 232 extends freely through depending portion 236, the forces transmitted to screw 232 will not be transmitted directly to blade holder 34. Instead, they are transmitted to reinforcing member 230 by virtue of the fit of screw 232 in screw hole 252.

The forces applied to member 230 will be transmitted through portions 242, 244, and 246 which provide relatively large force distribution area in contact with blade holder 34. As a result, the stress developed in blade holder 34 will be low to reduce the likelihood of structural failure of holder 34.

As shown in FIG. 2, a tilting base plate assembly 300 comprises a rigid base or shoe 302, a screw 304 swingably supporting base 302 and a nut 306. Base 302 is formed with a shoe portion 308 which has a flat bottom surface that is adapted to seat on and slide along a face of the workpiece being cut. As is well known, engagement of base 302 with the workpiece prevents the portion of the workpiece in the region of the kerf being cut from being drawn or bent upwardly with blade 26 on its upward cutting stroke.

As shown in FIGS. 2 and 21, base 302 is formed with a pair of flat sided, parallel, spaced apart ear portions 310 and 312. Ear portions 310 and 312 are integral with and extend upwardly and perpendicularly from shoe portion 308.

Ear portions 310 and 312 are respectively formed with elongated, arcuate, coextensive, aligned apertures 314 and 316 (see FIG. 1). Screw 304 extends through apertures 314 and 316 and also through a depending portion 318 (See FIGS. 5 and 1A) of housing 22. Depending portion 318 is disposed between ear portions 310 and 312. Ear portions 310 and 312 extend perpendicularly of the longitudinal axis of screw 304, and screw 304 is substantially parallel with the rotational axis of shaft 30 and is contained in a plane containing the abutment interface between edge surfaces 64 and 66 of shells 60 and 62.

Depending portion 318, which elongated longitudinally of housing 22, is split, half being formed by shell 60 and a complementary half being formed by shell 62. Adjacent to its enlarged head, screw 304 is radially trapped between recessed walls 320 (FIG. 3) and 321 (FIG. 4) of shells 60 and 62 respectively. Adjacent to its threaded end, screw 304 is radially trapped between recessed walls 322 (FIG. 3) and 323 (FIG. 4). Walls 320-323 form the front and rear wall portions of depending portion 318. Screw 304 is rotatably and axially displaceably supported in depending portion 318.

Nut 306 is threaded on the end of screw 304 extending forwardly and beyond ear portion 310. As best shown in FIG. 21, nut 306 is trapped and confined against rotational displacement only be engagement with interior surfaces that are respectively formed on complementary wall portions 326 (FIG. 3) and 328 (FIG. 4). Wall portions 326 and 328 are respectively formed on shells 60 and 62 and have edges that matingly seat against each other along the interface between edge surfaces 64 and 66.

Wall portions 326 and 328 form a further depending portion 330 (FIGS. 1, 1A and 2) which is longitudinally spaced from depending portion 318 by a downwardly and sidewardly opening notch 332 (FIG. 2). The upper end of ear 310 is slidably received in notch 332. Ear 310 thus butts against the front end face of depending portion 318, and ear 312 butts against the rear end face of portion 318.

The enlarged head of screw 304 and nut 306 respectively butt against the oppositely facing surfaces of ear portions 312 and 310. Thus, when screw 304 is threaded into nut 306, the head of screw 304 and nut 306 respectively bend ears 310 and 312 suficiently to urge or draw ears 310 and 312 toward each other and into snug clamping engagement with the front and rear end faces of depending portion 318.

Thus, depending portion 318 is firmly and separably clamped between ear portions 310 and 312. Ear portion 310 is thus clamped between nut 306 and the front end face of depending portion 318, and ear portion 312 is clamped between the head of screw 304 and the rear end face of depending portion 318. In this manner, base 302 is fixed in position on housing 22 and provides a support for housing 22.

To tilt or swing base 302 in one direction or the other about the axis of screw 304, screw 304 is turned in a direction to thread it out of nut 306, thus relaxing the clamping engagement of ear portions 310 and 312 against the front and rear end faces of depending portion 318. Base 302 is then free to be tilted in one direction or the other to a selected position angularly about the axis of screw 304, and screw 304 is then re-tighten to fix base 302 in its selected position. Apertures 314 and 316 guide the tilting motion of base 302.

From the foregoing description it will be appreciated that counterweight 150 is confined against lateral motion by the opposing sidewall portions of shells 60 and 62. It also will be appreciated that roller 142 is axially slidable relative to holder 34, thus permitting holder 34 to reciprocate along its axis of curvature in the manner previously described. It further will be appreciated that when screws 98 are tighten to securely clamp bearing 90 between insert 92 and cover 94, cover 94 will be confined against longitudinal movement, but cover 94 will longitudinally be located by engagement with bearing 90 before screws 98 are completely tighten.

By acceptable definition, a sabre saw is a portable, hand-held sawing tool in which the saw blade is supported only at one end from a holder. Normally, the saw blade teeth are oriented to cut in the direction in which the workpiece is urged against the base or base plate.

What is claimed and desired to be secured by Letters Patent is:

1. A hand-held, power-operated sabre saw comprising a housing, an integral handle for hand manipulation of said saw and a generally planar work-engaging surface adjustably attached to said housing, a saw blade holder curved along a longitudinally extending axis of curvature mounted in said housing for reciprocation along said axis of curvature, a saw blade fixed to said holder for reciprocation therewith along said axis of curvature, and drive means in said housing for reciprocating said holder along said axis of curvature to impart alternate cutting and return strokes to said blade, said axis of curvature being curved in a direction to provide said blade with a component of cutting stroke travel that is in the direction in which said blade is urged against a workpiece to cut said workpiece.

2. In a hand-held, power-operated sabre saw, a housing having an integral handle for hand manipulation of said saw and a generally planar work-engaging surface adjustably attached to said housing, a saw blade drive assembly comprising a reciprocable saw blade holder adapted to carry a saw blade for imparting alternate cutting and return strokes to said blade, said holder being curved along a longitudinally extending axis of curvature and mounted in said housing for reciprocating motion along said axis of curvature, and drive means disposed in said housing and operatively connected to said holder for reciprocating said holder along said axis of curvature, said axis of curvature being curved in a direction to impart to said blade a component of cutting stroke travel that is in the direction in which said blade is urged against a workpiece to cut said workpiece.

3. The power-operated sabre saw defined in claim 2 wherein the radius of said axis of curvature is uniform.

4. The power-operated sabre saw defined in claim 2 wherein said drive means comprises a rotatably mounted power driven member, means for rotating said member, and a part eccentrically mounted on said member for rotation in a circular path, said part cooperating with a portion of said holder to define a scotch yoke connection that translates the rotary motion of said member into reciprocable motion for reciprocating said holder, said part and said portion of said holder being slidably engaged with each other for relative displacement along a path that is parallel to the rotational axis of said member.

5. In a hand-held, power operated sabre saw, a housing having an integral handle for hand manipulation of said saw and a generally planar work-engaging surface adjustably attached to said housing, a saw blade drive assembly comprising a saw blade holder mounted in said housing for reciprocation, a saw blade securd to said holder for unitary movement therewith, bearing means mounted in said housing and engaging said holder for guiding the reciprocating movement of said holder, said holder being curved at least in the regions where it is engaged by said bearing means to reciprocate along a curved path that is determined by the curvature of said regions drive means disposed in said housing and operatively connected to said holder for reciprocating said holder and said blade as a unit along said path to thereby impart alternate cutting and return strokes to said blade, said path being curved in a direction that provides said blade with a component of cutting stroke travel that is in the direction in which said blade is urged against a workpiece to cut said workpiece.

6. The power-operated sabre saw defined in claim 5 wherein a portion of said holder is formed with a slot extending transverssely of said axis of curvature, and wherein said drive means comprises a power driven member rotatably mounted in said housing, means in said housing for rotating said member, and a part mounted eccentrically on said member for displacement in a circular path around the rotational axis of said member, said part slidably extending into said slot and cooperating therewith to define a scotch yoke connection that translates the rotary motion of said member into reciprocable motion for reciprocating said holder.

* * * * *